United States Patent [19]
Krein et al.

[11] Patent Number: 5,802,055
[45] Date of Patent: Sep. 1, 1998

[54] METHOD AND APPARATUS FOR DYNAMIC BUFFER ALLOCATION IN A BUS BRIDGE FOR PIPELINED READS

[75] Inventors: William Todd Krein, San Jose; Charles M. Flaig, Cupertino; James D. Kelly, Aptos, all of Calif.

[73] Assignee: Apple Computer, Inc., Cupertino, Calif.

[21] Appl. No.: 635,646

[22] Filed: Apr. 22, 1996

[51] Int. Cl.$^6$ .................................................... G06F 13/00
[52] U.S. Cl. .................... 370/402; 370/413; 395/292; 395/309
[58] Field of Search .......................... 370/402, 401, 370/403, 404, 405, 413, 412, 419; 395/292, 299, 305, 309, 310, 285, 308

[56] References Cited

U.S. PATENT DOCUMENTS

| | | | |
|---|---|---|---|
| 5,469,435 | 11/1995 | Krein | 370/85.2 |
| 5,535,340 | 7/1996 | Bell | 395/292 |
| 5,546,546 | 8/1996 | Bell | 395/292 |
| 5,588,125 | 12/1996 | Bennett | 395/306 |
| 5,615,343 | 3/1997 | Saraangdhar | 395/282 |
| 5,701,422 | 12/1997 | Kirkland, Jr. | 395/309 |
| 5,708,794 | 1/1998 | Parks | 395/481 |

*Primary Examiner*—Douglas W. Olms
*Assistant Examiner*—Matthew C. Phillips
*Attorney, Agent, or Firm*—Fenwick & West

[57] ABSTRACT

A bus bridge circuit employs a dynamic allocation scheme that allows read transactions to be pipelined without deadlock and without the need for permanently reserving multiple buffer slots for read response transactions. The bus bridge circuit associates input and output buffers with a node and includes a state machine to monitor the number and type of transaction packets currently in slots that make up the buffers. In particular, the state machine monitors the number of transaction packets loaded in the output buffer slots, the number of outstanding read transactions for the node, and the number of read response transactions currently loaded in the output buffer. The state machine then allows the node to load a READ or WRITE transaction only if the monitored data indicates at least one of the buffer slots will be available to service a READ RESPONSE subsequently loaded by the node. The state machine launches READs to the node only when an unallocated buffer slot is available to service the corresponding READ RESPONSE.

29 Claims, 6 Drawing Sheets

| DBAV=1 | DBAV=1 | DBAV=1 | DBAV=1 | DBAV=1 |
|---|---|---|---|---|
| ~(RR) | ~(RR) | (RR) | W | (RR) |
|  | W |  | RR | (RR) |

FIG. 4A   FIG. 4B   FIG. 4C   FIG. 4D   FIG. 4E

| DBAV=1 | DBAV=1 | DBAV=0 | DBAV=1 | DBAV=0 |
|---|---|---|---|---|
| W | (RR) | W | RR | (RR) |
| (RR) | W | W | W | W |
|  | W | W | W | W |
|  |  | ~(RR) |  | RR |

METHOD AND APPARATUS FOR DYNAMIC BUFFER ALLOCATION IN A BUS BRIDGE FOR PIPELINED READS

CROSS REFERENCE TO RELATED APPLICATIONS

This application is related to co-pending patent application Ser. No. 08/187,396, now U.S. Pat. No. 5,469,435 filed Jan. 24, 1994, entitled "Improved Bus Protocol Using Separate Clocks for Arbitration and Data Transfer". This patent application is assigned to the same assignee as herein, and is hereby incorporated by reference in its entirety.

BACKGROUND OF THE INVENTION

1. Technical Field

This invention relates to systems and methods for coupling message packets between the nodes of a computer system, and in particular, to methods and systems for dynamically allocating buffers for read responses to facilitate pipelined read transactions while avoiding deadlock.

2. Background Art

Known packet based bus systems employ split transactions to speed processing of transactions among the nodes coupled to the bus. These nodes are typically designated as source or destination nodes, depending on whether the node initiates the transaction or is the target of a transaction initiated by another node, respectively. For example, a source node employs a "dump & run" protocol in a split transaction bus, whereby the source node transfers data to a buffer associated with the destination node using a message packet and releases the bus before the data is coupled from the buffer to the destination node. This protocol frees the bus quickly, making it available for transactions between other nodes of the bus.

Read transactions are more involved than write transactions since the source node must transmit its data request to the destination node and the destination node must respond by writing the requested data back to the source node. In a split transaction bus, the read request is delivered to the destination node using a "dump & run" protocol. The bus is then released to service other transactions while the destination node retrieves the requested data. When the requested data is ready, the destination node requests the bus and delivers the data to the source node when the bus is granted. Thus, the split transaction protocol provides greater bandwidth than protocols that lock the bus while the source and destination node exchange their respective data packets.

A common configuration for implementing split transaction protocols employs a bus bridge circuit to couple a node to the bus. Conventional bus bridge circuits comprise a bus interface, a node interface, and a pair of buffers between the interfaces. One buffer serves as an output buffer, transferring data packets from the node to the bus, and the other buffer serves as an input buffer for the node, transferring data packets from the bus to the node. The interfaces are state machines that monitor the status of the buffers, load data packets in the buffers, and launch data packets from the buffers.

While bus bridge circuits facilitate implementation of split transaction protocols, they are also subject to deadlock. The problem may be illustrated by a simplified system in which the buffers of the bus bridge circuit comprise a single buffer slot each. If the node interface loads a read transaction into its output buffer while the bus interface loads a read transaction into the node's input buffer, deadlock may result. The node will not service the read request until its output buffer is available to receive the read response and the bus interface will not allow the read loaded by the node to be launched until the input buffer of the node is available to receive the read response. Since neither transaction can make forward progress, the system is deadlocked. Deadlock also arises at nodes having multiple input and output buffers when multiple read requests are exchanged, although it does so with less frequency.

Conventional systems eliminate deadlock by reserving a fixed buffer slot associated with each node to receive read responses and allowing the read transaction to proceed only when this buffer is available. This arrangement is inefficient since the reserved buffer is unavailable for other message packets, i.e. read and write transactions, even when it is not being used for read response transactions. Further, read transactions can not be pipelined since only one read may be processed at a time. Providing additional reserved buffers for read responses reduces these problems but is expensive, since it requires more buffers to maintain a given performance level.

SUMMARY OF THE INVENTION

The present invention ensures forward progress of pipelined read transactions in systems that implement packet-based, split transaction protocols, without relying on multiple reserved buffers in the circuits that bridge the nodes of the system. In particular, bridge circuits in accordance with the present invention include state machines that implement a dynamic buffer slot allocation scheme. The dynamic nature of the buffer slot allocation scheme eliminates the need to reserve one or more specific buffer slots for servicing read transactions, while ensuring that at least one buffer slot will be available for read responses generated by the node. The availability of multiple buffer slots for servicing read transactions allows read transactions to be pipelined without limiting the availability of these buffer slots for servicing other non-read transactions.

In accordance with the present invention, a pair of nodes, such as a bus and a device, a pair of devices, or a pair of buses, communicate through a bridge circuit. The bridge circuit comprises a pair of multiple slot buffers that are coupled to each of the nodes through an interface circuit associated with each node. Each buffer serves as the output buffer for one of the nodes and the input buffer for the other node. Each interface circuit includes a state machine that monitors the transactions loaded by the associated node and the transactions launched to the associated node. In particular, the number of outstanding read transactions pending at the associated node, the number of output buffer slots currently in use, and the number of read response transactions loaded in the output buffer slots are tracked by the state machine to determine whether a new transaction packet can be loaded into the output buffer of the associated node.

The state machine allows the node to load a new transaction to its associated output buffer when the monitored transactions indicate that at least one buffer slot will be available to service a subsequent read response transaction from the node. In a preferred embodiment, the state machine allows the node to load a new read or write transaction to its associated output buffer if the sum of the output buffer slots in use and the number of outstanding read transactions to the node is less than the total number of buffer slots and one of the following conditions is met: at least two buffer slots are not loaded; at least one read transaction is outstanding; or at least one buffer slot is loaded with a read response.

The state machine allows a read transaction to be launched to the node from its associated input buffer provided the monitored transactions indicate that an unallocated buffer slot is available in the associated output buffer for loading the read response. In a preferred embodiment, the state machine allows the read transaction to be launched to the node when the sum of the output buffer slots in use and the number of outstanding read transactions to the node is less than the total number of buffer slots. Since the state machines associated with each node employ the same allocation scheme, forward progress of read transactions is ensured, and read response transactions may be loaded automatically by the responding node.

The present invention avoids deadlock by loading from a node only those transactions that can be serviced while maintaining an output buffer slot for the read responses to each outstanding read transaction at the node. This ensures forward progress for pipelined read transactions without limiting availability of buffer slots for servicing other transactions. In particular, no buffer slot need be permanently reserved for read responses.

DETAILED DESCRIPTION OF THE INVENTION

Figure 1A:
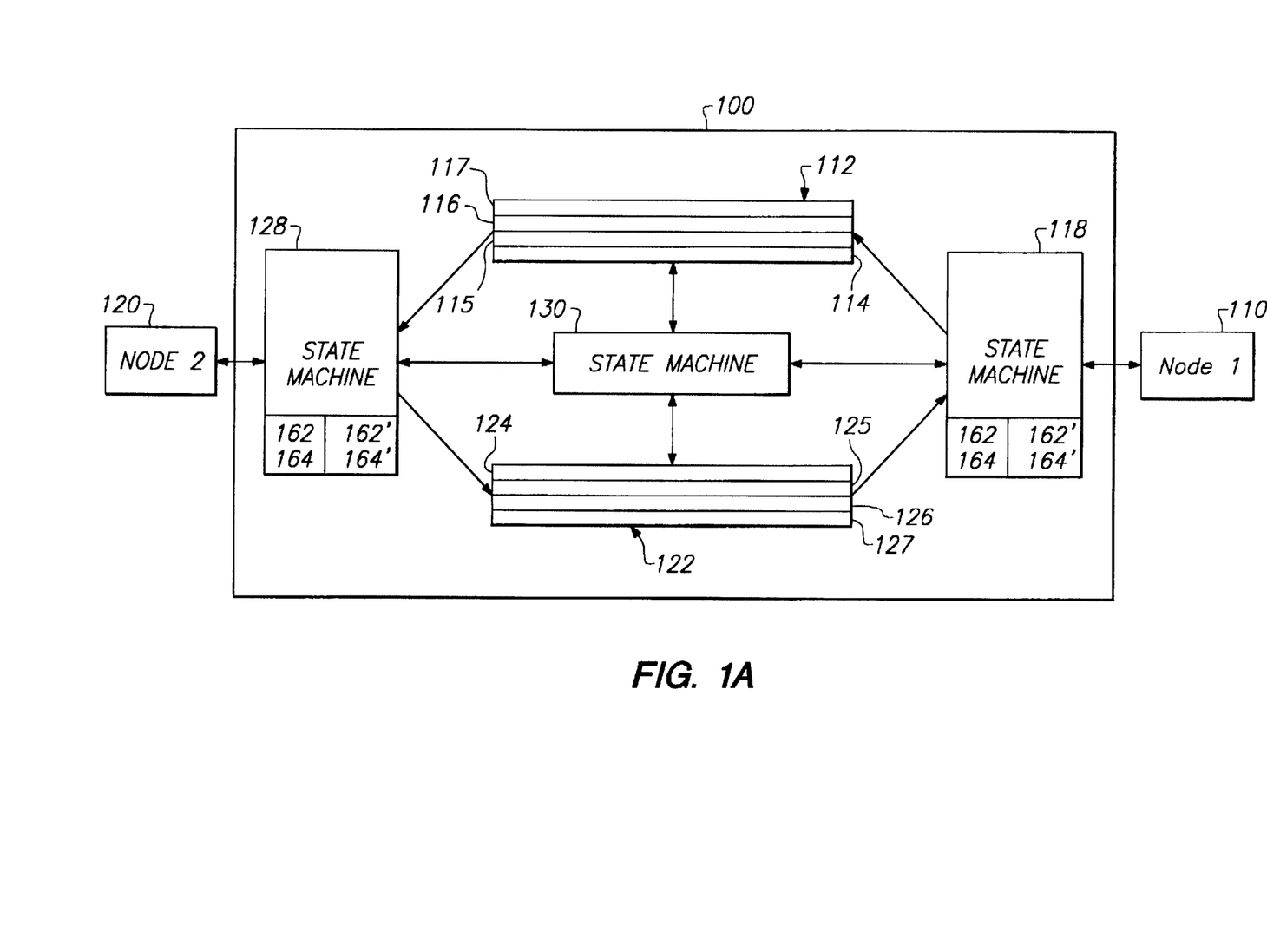
FIG. 1A is a block diagram of a system for dynamically allocating buffers for pipelined reads in accordance with the present invention.

Referring to FIG. 1, there is shown a block diagram of a bridge circuit 100 in accordance with the present invention for processing transactions between a first node 110 and a second node 120 in a system employing a packet-based, split transaction protocol. Typically, first node 110 is a peripheral device and second node 120 is a bus. However, first and second nodes 110, 120 may both be buses or devices. In order to keep the discussion general, first and second nodes 110, 120 are not identified further, except where the discussion requires greater specificity.

Bridge circuit 100 comprises first and second buffers 112, 122 and first and second state machines 118, 128, which form the interfaces between buffers 112, 122 and first and second nodes 110, 120, respectively. First state machine 118 regulates the transfer of transaction or data packets between buffers 112, 122 and first node 110. Second state machine 128 similarly regulates the transfer of data packets between node 120 and first and second buffers 112, 122. A third state machine 130 couples information between first and second state machines 118, 128 and between these state machines and buffers 112, 122. State machine 130 also handles the translation of clock signals necessary to couple signals between state machines 118 an 112. State machines 118, 128, and 130 are identified separately for convenience. In practice, state machine 130 may be distributed between state machines 118 and 128 or state machines 118, 128, 130 may be regarded as different, interconnected parts of a single state machine.

First and second buffers 112, 122 comprise buffer slots 114-117 and 124-127, respectively. The four buffer slots shown represent a reasonable trade-off between bandwidth and cost. This number is fairly typical for buffers in bridge circuits, although it is by no means essential. As indicated by the arrows, first buffer 112 operates as an output buffer for first node 110, with first state machine 118 regulating the loading of data packets from first node 110 to buffer 112. Buffer 112 also serves as an input buffer for node 120 with second state machine 128 regulating the launching of data packets from buffer 112 to node 120. Similarly, buffer 122 serves as an output buffer for node 120 and an input buffer for node 110, with state machine 128 regulating the loading of data packets from node 120 to buffer 122 and state machine 118 regulating the launching of data packets from buffer 122 to node 110.

Multiple buffer slots 114-117, 124-127 allow first and second nodes 110, 120 to pipeline transactions under control of state machines 118, 128 in accordance with the allocation scheme described below. For this purpose, status bits 160, 162 and 162', 164' associated with each of buffer slots 114-117 and 124-127, respectively, are tracked by state machines 118, 128. Status bits 162, 164, 162', 164' convey information about slot availability, and state machine 130 ensures that this information is available in each of state machines 118, 128 along with address information on loaded data packets. Addressing schemes for buffers 112, 122 are well known and are not discussed in greater detail here.

Figure 1B:
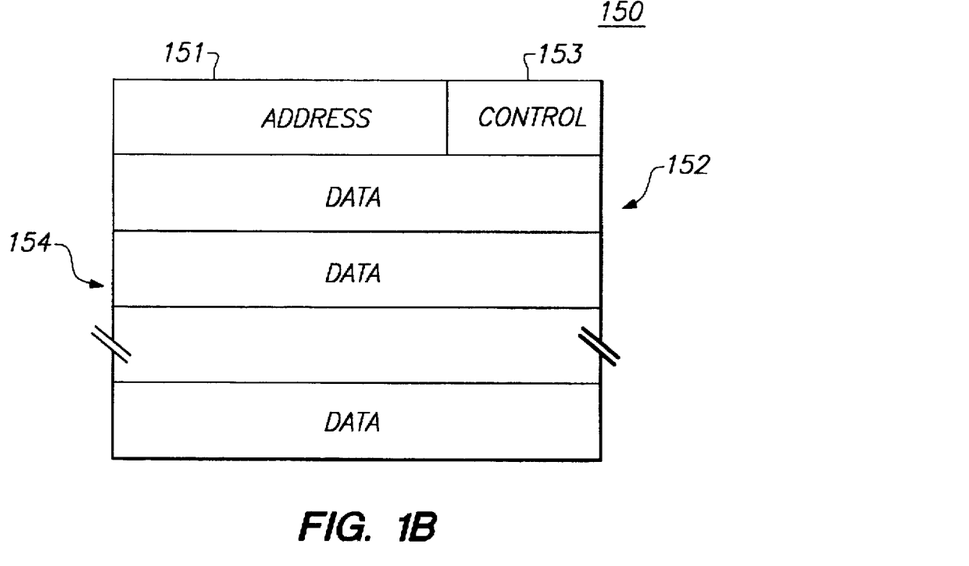
FIG. 1B is a block diagram of a data packet suitable for transmission on a packet-based, split transaction bus.

Referring now to FIG. 1B, there is shown a representation of a data packet 150 suitable for implementing transactions between first and second nodes 110, 120. Data packet 150 comprises a header 152 and a data section 154. Header 152 includes address bits 151 which specify the ultimate destination to which data packet 150 is directed. In the illustrated embodiment, where destination node 120 is a bus, header 152 specifies which node coupled to the bus is the destination node. Header 152 also includes control bits 153 which specify the type of transaction, i.e. read, write, read response, and the amount of data in data section 154. Transaction type information contained in control bits 153 is used by state machines 118, 128 to implement the method of the present invention.

Operation of system 100 will now be described for transactions loaded from node 110 to (output) buffer 112 and transactions launched from (input) buffer 122 to node 110 under control of state machine 118. Bridge circuit 100 is symmetrical with respect to nodes 110 and 120, and it will be understood by those skilled in the art that the described operations are similar for transactions to and from node 120 under control of state machine 128 by virtue of the symmetry of system 100.

State machine 118 continually monitors the status of node 110 and its associated input and output buffers 122, 112. In a preferred embodiment, state machine 118 includes counters INUSE, RRESV and RRCOUNT, maintained by its internal logic, to track load and launch transactions. INUSE is the sum of status bits 162, one of which is associated with each buffer slot 114-117. A status bit 162 is set to one if a data packet is loaded or in the process of being loaded into its associated buffer slot. Status bit 164 is set to indicate when the data packet is loaded and valid.

RRESV tracks the number of outstanding read transactions ("READs") for node 110. Outstanding READs are those that have been accepted by node 110 for processing but for which node 110 has yet to generate a read response transaction ("RResp"). RRESV is incremented when node 110 accepts a READ and is decremented when node 110 loads a RResp.

RRCOUNT tracks the number of RResps loaded into buffer slots 114–117. The number of RResps are relevant to the availability of output buffer slots 114–117 because a loaded RResp can be launched to free up the one of buffer slots 114–117 into which it was loaded. This is facilitated by a priority scheme that launches RResps from output buffer 112 before READs and write transactions ("WRITEs") are launched. Specifically, RRCOUNT>0 indicates that RResps are pending in buffer 112 and these are launched in the order received, prior to launching READs and WRITES. The latter transactions are launched on a first-in first-out basis when no RResps are pending in buffer 112. The additional buffer slot freed by launching a RResp allows output buffer 112 to accept a new data packet from node 110 under circumstances that are discussed in greater detail below.

The capacity of output buffer 112 to accept new data packets from node 110 without risking deadlock is indicated by a signal DBAV. DBAV is set to one, indicating loading can proceed, for only certain combinations of INUSE, RRESV, and RRCOUNT. The combinations of status bits 162 (INUSE) and counters for which DBAV is one are represented symbolically as follows:

$$DBAV=(ALLOC<4) \& [(ALLOC<3)|(RRESV>0)|(RRCOUNT>0)] \quad (I)$$

Here, ALLOC equals the sum of INUSE and RRESV, which represent the number of buffer slots 114–117 that are either explicitly or implicitly allocated to data packets. A buffer slot 114–117 is explicitly allocated when it is loaded or in the process of being loaded with a data packet, in which case its associated status bit 162 is set to one. One of buffer slots 114–117 is implicitly allocated for each count in RRESV, but no specific buffer slot 114–117 has its status bit 162 set. That is, RRESV is a bookkeeping parameter which tracks the number of buffer slots 114–117 necessary to handle RResps generated by node 110 in response to any outstanding READs from node 120. A specific buffer slot 114–117 need not be assigned to receive the RResp, but at least one buffer slot 114–117 must be available to service the RResp when it is generated.

If all buffer slots 114–117 are allocated to some combination of existing packets or pending READs (INUSE+RRESV=4 in the disclosed embodiment), DBAV is zero and state machine 118 will prevent node 110 from loading a READ or WRITE to output buffer 112.

If at least one of buffer slots 114–117 is available (ALLOC<4 in the disclosed embodiment), DBAV is set to one or zero depending on the remaining conditions in (I). For example, if at least two of buffer slots 114–117 are not allocated in any way (ALLOC<3 in the disclosed embodiment), DBAV is one and state machine 118 will allow node 110 to load its READ or WRITE data packet. In this case, addition of the new data packet still leaves one of buffer slots 114–117 available to service a RResp provided by node 110 in response to an outstanding READ.

If only one of buffer slots 114–117 is not allocated to a current (explicit) or pending (implicit) data packet (ALLOC=3 in the disclosed embodiment), DBAV may still be set to one under certain circumstances, without risking deadlock. For example, if at least one of buffer slots 114–117 is implicitly allocated by virtue of an outstanding READ for which node 110 must respond (RRESV>0) DBAV may be set to one. In this case, only two of buffer slots 114–117 are explicitly allocated to data packets, and loading a data packet into the unallocated one of buffer slots 114–117 still leaves one of buffer slots 114–117 available for the RResp subsequently generated by node 110. This guarantees forward progress for the outstanding READ when node 110 responds. Similarly, if one or more of buffer slots 114–117 is loaded with a RResp (RRCOUNT>0), DBAV may be set to one. In this case, the RResp can be launched from output buffer 112 to node 120. This empties a second one of buffer slots 114–117, so that loading of the data packet by node 110 still leaves another of buffer slots 114–117 available for any RResp subsequently generated by node 110 to satisfy an outstanding READ.

Launching READs to node 110 from input buffer 122 is allowed whenever at least one of buffer slots 114–117 is neither implicitly nor explicitly allocated, i.e. 4-ALLOC<0 for the case of four buffer slots. By checking ALLOC prior to launching a READ, state machine 118 prevents node 110 from accepting the READ unless it has an output buffer slot 114–117 available to process the corresponding RResp.

Figure 2:
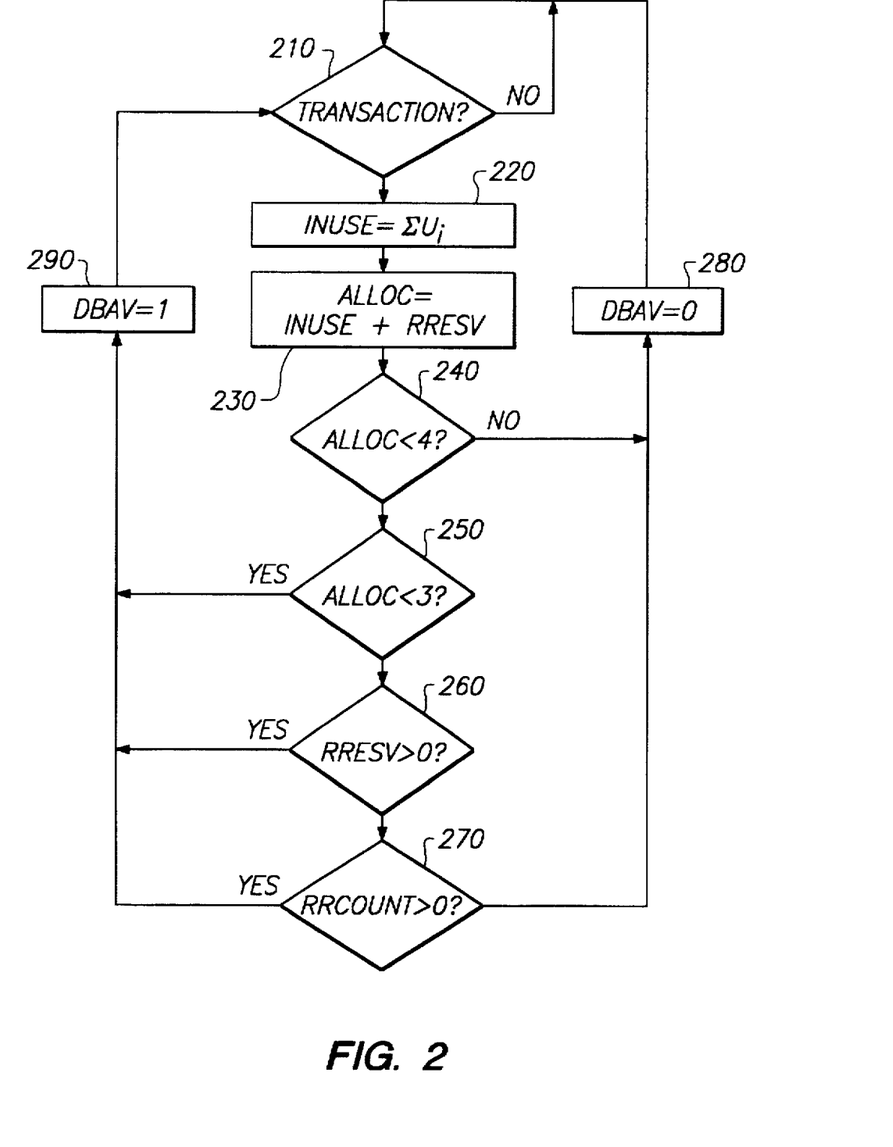
FIG. 2 is a flow chart of a method for determining whether an output buffer slot is available for loading a new transaction from the associated node.

Referring now to FIG. 2, there is shown a flow chart of a method 200 implemented by state machine 118 for setting and resetting DBAV in the case where buffers 112, 122 each comprise four buffer slots 114–117, 124–127, respectively. Update of DBAV is triggered when a completed transaction, such as loading a data packet from node 110 or launching a data packet to node 110 is detected 210. In this case, INUSE is updated 220 to reflect any changes in the status of buffer slots 114–117, and ALLOC is updated 230 to reflect the changes INUSE and any changes in the number of outstanding READs for node 110, as reflected in RRESV.

When all buffer slots 114–117 are allocated 240 to accommodate either actual data packets (162 set) or anticipated RResps, DBAV is set 280 to zero. On the other hand, if ALLOC is less than the total number of buffer slots (four in the disclosed embodiment), the counters INUSE, RRESV, and RRCOUNT are checked, as necessary, at steps 250, 260 and 270, respectively, to determine how buffer slots 114–117 are allocated. For example, if at least two of buffer slots 114–117 are not allocated either implicitly or explicitly, DBAV is set. If only a single buffer slot 114–117 is unallocated, then DBAV is set to one only if at least one READ to node 110 is outstanding 260 (RRESV) or at least one of buffer slots 114–117 is loaded with a RResp 270. In all other cases, DBAV is set 280 to zero.

As noted above, state machine 118 need only check ALLOC to determine when a READ transaction in input buffer 122 may be launched to node 110. The READ is launched whenever the difference between ALLOC and the number of buffer slots is not zero.

Figure 3A:
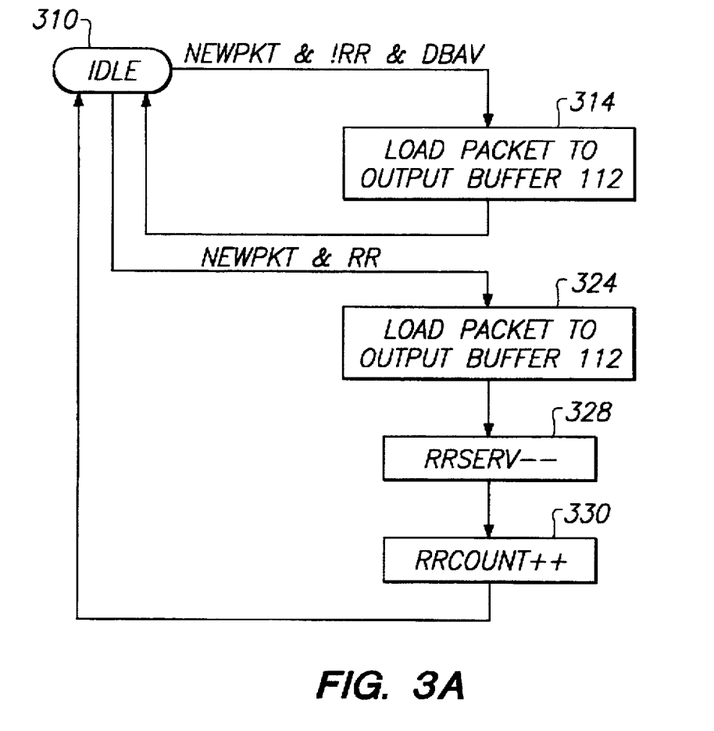
FIGS. 3A and 3B are state machine diagrams of the interface circuits shown in FIG. 1A.

Referring now to FIG. 3A, there is shown a diagram of state machine 118 and the various states it enters in response to requests from node 110 to load different data packets to output buffer 112. Node 110 signals to state machine 118 when it has a data packet for loading to output buffer 112 by asserting a signal NEWPKT. State machine checks control bits 153 of the data packet to determine the transaction type it represents. If control bits 153 indicate the packet is not a RResp and if DBAV is set to one (!RR & DBAV), state machine 118 transfers from IDLE state 310 to load state 314, where the data packet is loaded from node 110 to output buffer 112. If control bits 153 indicate that the data packet is a RResp, state machine 118 transfers from IDLE state 310 to states 324, 328, and 330, where the data packet is loaded to output buffer 112, counter RRESV is decremented, and counter RRCOUNT is incremented, respectively. In this case. DBAV is not checked because the allocation scheme of the present invention ensures that one of buffer slots 114–117 is available for the RResp.

For data packets inbound to node 110, the status of input buffer slots 124–127 and corresponding packets are tracked and communicated to state machine 118 by state machine 130 (FIG. 1). When a packet for node 110 is present in input buffer 122, a signal PKT is asserted to state machine 118 along with a signal identifying the transaction type of the packet. Here, PKT is determined from used (U) and valid (V) status bits 162', 164' as follows:

$$PKT=(U_{124}\ \&\ V_{124})|(U_{125}\ \&\ V_{125})|(U_{126}\ \&\ V_{126})|(U_{127}\ \&\ V_{127})$$

where the subscripts indicate one of buffer slots 124–127 with which the status bits are associated. State machine 118 uses these signals in combination with DBAV to determine whether and when to launch the packet from input buffer 122 to node 110.

Figure 3B:
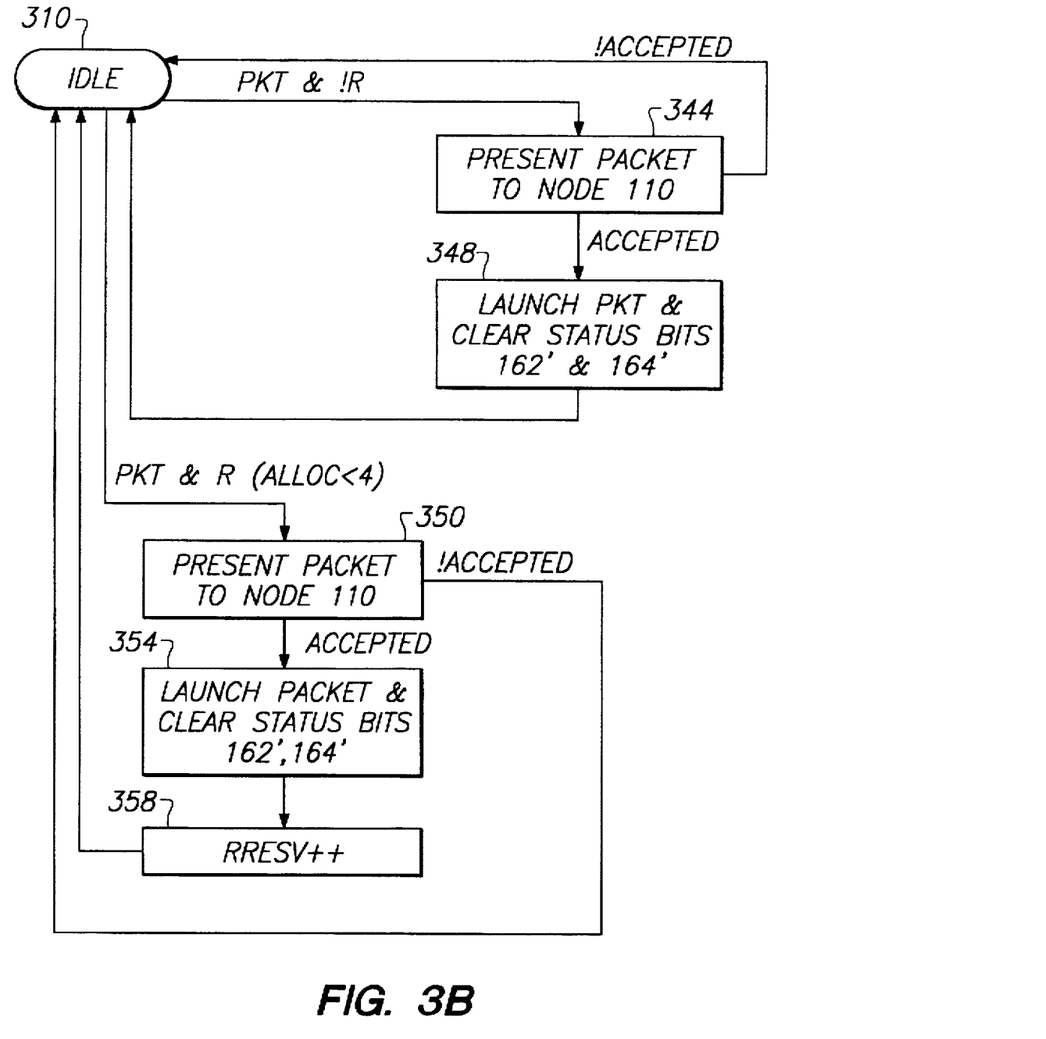

Referring now to FIG. 3B, there is shown a diagram of state machine 118 and the various states it enters in response to signals from state machine 130 regarding data packets loaded in input buffer slots 124–127 by node 120. From IDLE state 310, state machine 118 transitions to state 344 when PKT is asserted and the data packet to be launched from in input buffer 122 is not a READ packet (PKT & !R). Depending on its current activities and the priority scheme employed, node 110 may or may not be in a position to accept the data packet from input buffer 122. If node 110 does not accept the packet (!ACCEPT), state machine 118 returns to IDLE state 310 where it may try to launch the unaccepted data packet or a different data packet. If node 110 accepts the data packet, state machine 118 launches 348 the data packet to node 110 and clears status bits 162', 164' of the associated one of buffer slots 124–127.

A person skilled in the art will recognize that there are many priority schemes that are consistent with the present invention and that may be employed by node 110 to determine when to accept a data packet. Examples of such schemes are round-robin priority schemes and fixed priority schemes. These priority schemes are outside the scope of the present invention and are not discussed any further here.

When PKT is asserted and the data packet in input buffer 122 is a READ, state machine 118 checks ALLOC to determine whether there is sufficient buffer space available in output buffer 112 to service the RResp that node 110 will generate in response to the READ. If ALLOC<4, state machine 118 enters state 350, where it presents the data packet to node 110. If node 110 accepts the data packet, state machine 118 launches 354 the data packet to node 110 and resets status bits 162', 164' corresponding to the one of buffer slots 124–127 from which the data packet was launched. State machine 118 then increments 358 RRESV to indicate the addition of an outstanding READ for node 110.

State machine 118 is further illustrated by reference to FIGS. 4A–4J which are representations of output buffer slots 114–117 in which data packets representing different transactions are loaded. For this discussion, WRITEs and READs are both represented by W and RResps are represented by RR. (RR) is used to indicate an outstanding R for which node 110 has yet to provide a response. For convenience, (RR) is located in one of buffer slots 114–117, but it is important to note that status bit 162 associated with the buffer slot is not set. Rather, outstanding READs are tracked by RRESV. ~(RR) designates a phantom read response which is present as a place holder when no outstanding READs are pending at node 110. ~(RR) guarantees that a subsequent READ launched to node 110 will be able to make forward progress when node 110 generates its response.

It is important to note that ~(RR) like (RR) is not tied to any particular buffer slot 114–117. It is essentially a place holder that prevents deadlock in the event a READ is launched to node 110 when all of output buffer slots 114–117 are explicitly allocated to data transactions directed to node 120.

Figure 4A:
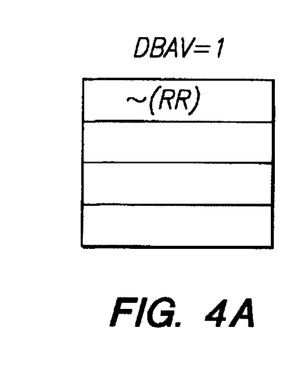
FIGS. 4A-4J are representations of the output buffer slots associated with a node in various states of availability.
Figure 4B:
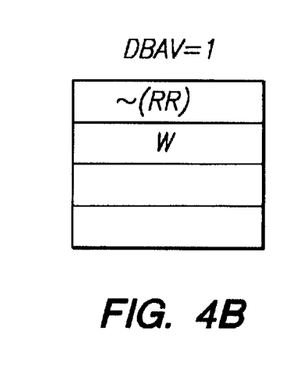
Figure 4C:
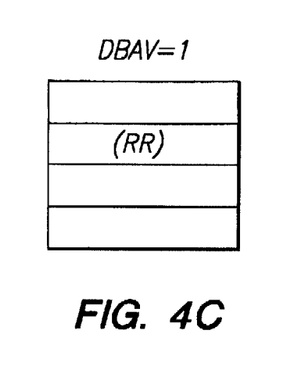
Figure 4D:
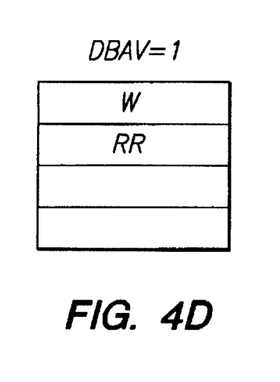
Figure 4E:
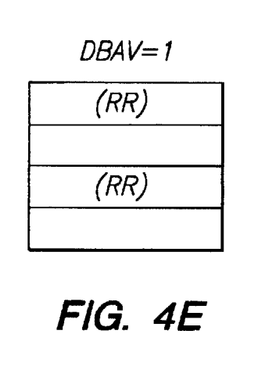
Figure 4F:
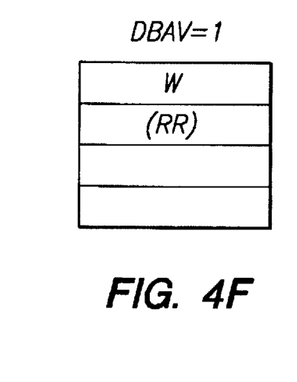

FIG. 4A shows output buffer 112 empty, except for ~(RR), which is a bookkeeping marker that is present when no outstanding READs are pending for node 110. Since at least two of buffer slots 114–117 are available, one may be explicitly allocated to the data packet being loaded by node 110 without risking deadlock if a subsequent READ is launched to node 110.

FIGS. 4B–4F show output buffer 112 in which two or fewer of buffer slots 114–117 are allocated, explicitly or implicitly, for data packets. In each case, the availability of two of buffer slots 114–117 when node 110 presents its new data packet means that the new data packet can be accommodated while leaving one of buffer slots 114–117 available for a subsequent READ to node 110. Note that no slot is marked ~(RR) when node 110 has an outstanding READ, indicated by (RR), or when node 110 has loaded a RResp, indicated by RR, into buffer 112. Thus, in each of the situations depicted in FIGS. 4A–4F, DBAV will be set, allowing node 110 to load another data packet to output buffer 112.

Figure 4G:
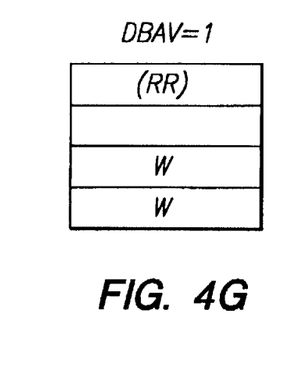
Figure 4H:
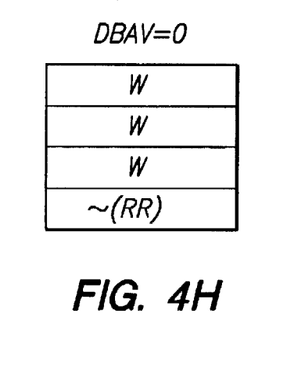
Figure 4I:
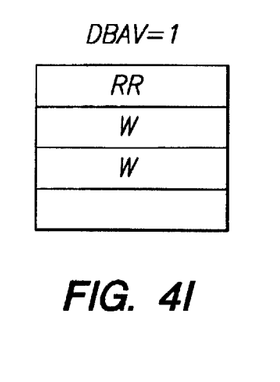

Referring now to FIG. 4G–4I, output buffer 112 is shown with various combinations of three of buffer slots 114–117 allocated explicitly to actual transactions or implicitly to outstanding READs. As indicated in the Figs., DBAV may or may not be set, depending on the type of transaction for which three of buffer slots 114–117 have been allocated.

In FIG. 4G, two of buffer slots 114–117 are explicitly allocated to READs/WRITEs and an outstanding READ to node 110 has implicitly allocated one of buffer slots 114–117 for a response. (RR). DBAV is set to one in this case, since the implicit allocation (RR) guarantees one of buffer slots 114–117 is available for a read response even after node 110 loads the new data packet into the unallocated slot.

In FIG. 4H, three of buffer slots 114–117 are explicitly allocated to READs/WRITEs, leaving a single buffer slot to handle data packets from node 110. The method implemented by state machine 118 effectively allocates the unloaded buffer slot with a phantom reservation, ~(RR), to ensure its availability for a subsequent READ to node 110. Thus, DBAV is set to zero in this case.

Referring now to FIG. 4I, one of three buffer slots 114–117 explicitly allocated to a data packet is loaded with a RResp and another buffer slot is not allocated at all. Like the configuration in FIG. 4G, DBAV is one in this case. In addition, by implementing a scheme that give priority to launching RResps, state machine 118 may also free up the one of buffer slots 114–117 is loaded with a RResp transaction. Consequently, no ~(RR) is necessary in this case, despite the explicit allocation of three of buffer slots 114–117.

Figure 4J:
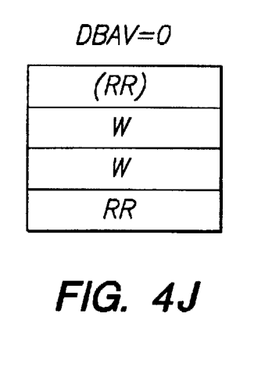

Referring now to FIG. 4J, all of buffer slots 114–117 are allocated explicitly or implicitly, and state machine 118 will prevent node 110 from loading a new data packet. Note that the state represented by FIG. 4J would result from that of FIG. 4G if node 110 loaded a RResp when allowed by state machine 118.

The difference between the load and launch criteria for READ transactions is illustrated in FIGS. 4H and 4J. With buffer slots 114–117 allocated as indicated in FIGS. 4H and 4J, state machine 118 does not allow node 110 to load either READ or WRITE transactions (DBAV=0). For the configuration of FIG. 4H, however, READ (and WRITE) transactions may be launched to node 110, while in the configuration of FIG. 4J, state machine 118 will not allow launch of the READ transaction.

Figure 5A:
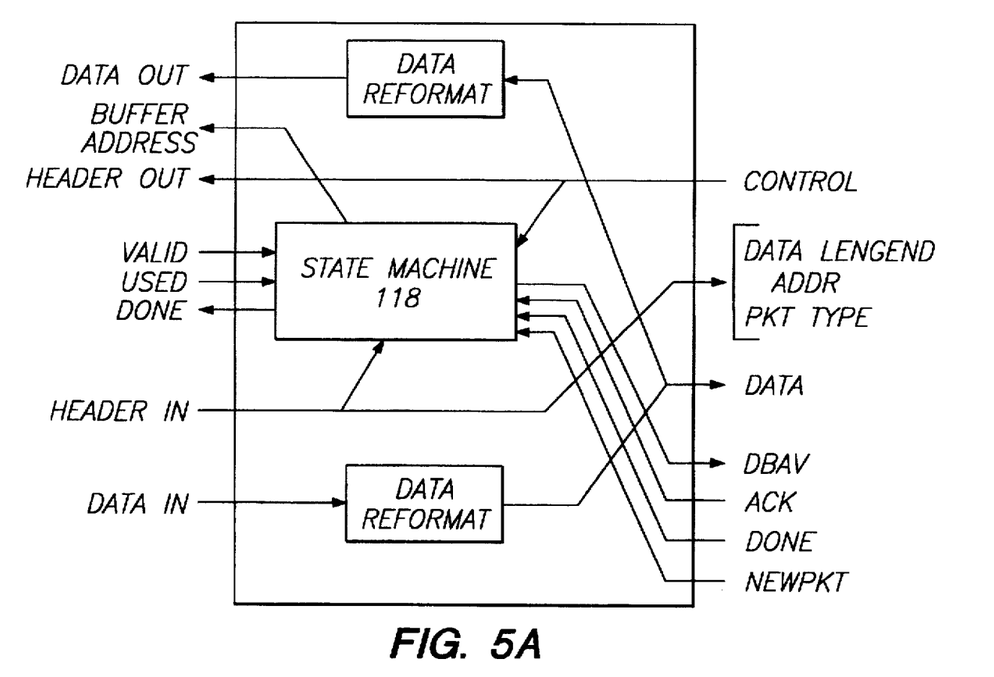
FIGS. 5A and 5B are detailed block diagrams of interface circuits including state machines suitable for use where the nodes correspond to a bus and a device.
Figure 5B:
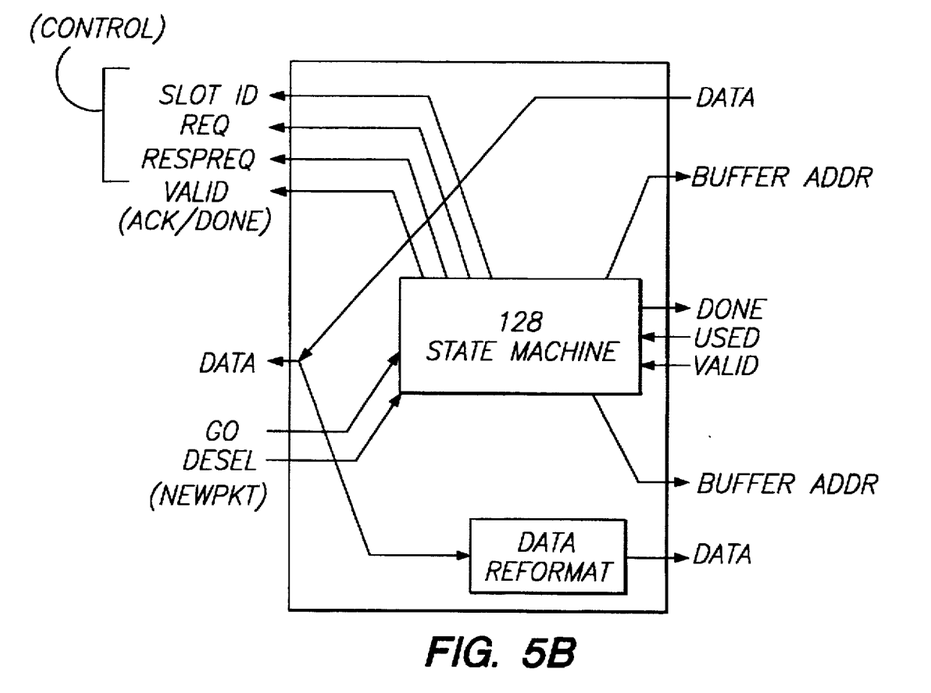

Referring now to FIGS. 5A and 5B, there are shown block diagrams of state machines 118, 128 for the case where node 110 is a peripheral device or card and node 120 is a bus. In FIG. 5A, NEWPKT is asserted by node 110 (not shown) when it has a transaction packet to be loaded to output buffer 112 and CONTROL provides state machine 118 with information on the type of the transaction packet to be loaded, i.e. R, RR, W. HEADER-IN provides state machine 118 with information on the type of transaction packet to be launched to node 110 from buffer 122, its location in input buffer 122, and its size. ACCEPT is asserted by node 110 when it is available to receive the launched transaction packet (or some part of the launched transaction packet), and DONE is asserted by node 110 when transfer of the launched packet to node 110 is complete. Status bits 162, 164, 162', 164' for output buffer slots 114–117 and input buffer slots 124–127, respectively, are updated through the signal lines labeled USED and VALID, and DONE is asserted by state machine 118 to indicate to buffers 112, 122 that a load or launch is complete.

Referring now to FIG. 5B, there are shown signals appropriate when node 120 is a bus (not shown). In this case, SLOT ID, REQ, and RESPREQ of state machine 128 are asserted to a bus arbiter (not shown) and correspond to the CONTROL signal asserted by node 110, i.e. they indicate the type of data transaction to be launched to a node on the bus. VALID is a bidirectional signal that corresponds to ACCEPT/DONE in FIG. 5A. GO and DESEL are asserted by the arbiter to state machine 128 indicating that node 120 may launch a packet (GO) or that a data packet is to be launched to node 120 (DESEL≈NEWPKT) from a node on the bus.

There has thus been disclosed a system and method for dynamically allocating buffer slots to facilitate pipelining READ transactions without the risk of deadlock. A state machine forming an interface between a node and its input and output buffers tracks the number of outstanding READ transactions pending at the node and the number of RResps loaded into the node's output buffer. An output buffer available signal, DBAV, is then set to one or zero, according to whether the current status of pending READ transactions and loaded outbound transactions leave enough buffer slots available in the output buffer to guarantee forward progress for READs pending at the node.

While particular embodiments of the invention have been disclosed in this application, it is understood that the invention is not limited to these embodiments. Having described the preferred embodiments, many modifications and variations may now be apparent to those skilled in the art. It is contemplated that the present application covers all such modifications and variations, limited only by the spirit and scope of the appended claims.

What is claimed is:

1. A bridge circuit for transmitting message packets between a first and second node in a system employing a packet switched, split transaction bus protocol, the bridge circuit comprising:

first and second buffers, each buffer having an input line, an output line and a number of buffer slots for temporarily storing message packets; and a first state machine coupled to the first node, to the input line of the first buffer and to the output line of the second buffer, the first state machine including a first counter for monitoring outstanding read transactions launched to the first node, a second counter for monitoring read response transactions loaded into the first buffer by the first node, and a third counter for monitoring currently loaded buffer slots of the first buffer, the first state machine including logic for transferring transactions to and from the first node according to launch and load slot availability criteria determined from the first, second, and third counters; and a second state machine coupled to the second node, to the input line of the second buffer, and to the output line of the second buffer, the second state machine including a first counter for monitoring outstanding read transactions launched to the second node, a second counter for monitoring read response transactions loaded into the second buffer by the second node, and a third counter for monitoring currently loaded buffer slots of the second buffer, the second state machine also including logic for transferring transactions to and from the second node according to launch and load slot availability criterion determined from the first, second, and third counters.

2. The bridge circuit of claim 1, wherein the load slot availability criterion is represented by a signal that is asserted when the number of buffer slots exceeds the sum of the first and third counters by at least two.

3. The bridge circuit of claim 2, wherein the load slot availability signal is also asserted when the number of buffer slots exceeds the sum of the first and third counters by one and the first counter is non-zero.

4. The bridge circuit of claim 2, wherein the load slot availability signal is also asserted when the number of buffer slots exceeds the sum of the first and third counters by one and the second counter is non-zero.

5. The bridge circuit of claim 2, wherein the load slot availability signal is also asserted when the number of buffer slots exceeds the sum of the first and third counters by one and either the first counter is non-zero or the second counter is non-zero.

6. The bridge circuit of claim 1, wherein the launch slot availability criteria is met when the number of buffer slots exceeds the sum of the first and third counters.

7. The bridge circuit of claim 1, wherein each of the first and second state machines includes logic for ensuring that read response transactions are launched before write and read transactions.

8. The bridge circuit of claim 1, further comprising a third state machine coupled to the first and second buffers and the first and second state machines, for transferring status information among the first and second buffers and the first and second state machines.

9. A state machine for regulating transfer of data packets between a node and associated input and output buffers, the state machine comprising:

a transmission line for receiving outbound data packet information from the node and sending a packet loading signal to the node;

a transmission line for receiving inbound data packet information from the input buffer and sending a packet launching signal to the input buffer;

a status memory location for tracking a data packet in a slot associated with the output buffer;

first and second transaction type memory locations for tracking outstanding read data packets and loaded read response data packets, respectively; and control logic for transferring data packets to and from the node when the status and transaction type memory locations indicate that a slot availability criterion has been met.

10. The state machine of claim 9, wherein the control logic transfers packets to the node when a launch slot availability criterion is met and transfers packets from the node when a load slot availability criterion is met.

11. The state machine of claim 10, wherein the first and second type memory locations are first and second counters, the first counter being incremented when a read packet is launched to the node and decremented when a read response packet is loaded from the node, and the second counter being incremented when a read response packet is loaded from the node and decremented when a read response packet is launched from the output buffer.

12. The state machine of claim 11, wherein the status memory location comprises a status bit associated with each slot of the output buffer, the status bit of a slot being set when the associated slot holds a data packet.

13. The state machine of claim 10, wherein the load slot availability criterion is met when the number of buffer slots of the output buffer exceeds the sum of set status bits and the first counter by at least a first threshold.

14. The state machine of claim 13, wherein the first threshold is two.

15. The state machine of claim 10, wherein the load slot availability criterion is met when the number of buffer slots exceeds the sum of set status bits and the second counter by a second threshold and the first counter is non-zero.

16. The state machine of claim 15, wherein the second threshold is one.

17. The state machine of claim 11, wherein the load slot availability criterion is met when the number of buffer slots exceeds the sum of set status bits and the second counter by a second threshold and the second counter is non-zero.

18. The state machine of claim 17, wherein the second threshold is one.

19. The state machine of claim 10, wherein the load slot availability criterion is met when the number of buffer slots of the output buffer exceeds the sum of set status bits and the first counter by at least a first threshold or when the number of buffer slots exceeds the sum of set status bits and the second counter by a second threshold that is less than the first threshold and either the first or second counter is non-zero.

20. The state machine of claim 19, wherein the first threshold is two and the second threshold is one.

21. The state machine of claim 10, wherein the launch slot availability criterion is met when the number of buffer slots of the output buffer exceeds the sum of set status bits and the first counter.

22. In a packet transfer circuit comprising a plurality of output buffer slots for coupling transaction packets from a first node to a second node and a plurality of input buffer slots for coupling transaction packets from the second node to the first node, a method for dynamically allocating one of the plurality of output buffer slots for a transaction packet, the method comprising the steps of:

monitoring the plurality of output buffer slots to determine a first number of the output buffer slots that are loaded with transaction packets determining a second number of the loaded transaction packets that are read response transactions;

monitoring the plurality of input buffer slots to determine a third number of outstanding read transactions that have been launched to the first node;

loading a transaction from the first node when the first, second, and third numbers satisfy a load slot availability criterion.

23. The method of claim 22, wherein the loading step comprises the substeps of:

determining a difference between the plurality of output buffer slots and a sum of the first and third numbers; and indicating to the first node that the load slot availability criterion is satisfied when the difference is two or more.

24. The method of claim 23, comprising the additional substep of indicating to the first node that the load slot availability criterion is satisfied when the difference is one and the second number is non-zero.

25. The method of claim 22, comprising the additional substep of indicating to the first node that the load slot availability criterion is satisfied when the difference is one and the third number is non-zero.

26. The method of claim 22, comprising the additional substeps of:

determining a difference between the plurality of output buffer slots and a sum of the first and third numbers; and indicating to the first node that the load slot availability criterion is satisfied when the difference is two or more, or when the difference is one and either the second number of the third number is non-zero.

27. The method of claim 22, comprising the additional substep of launching a transaction to the first node when the first and second numbers satisfy a launch slot availability criterion.

28. The method of claim 27, wherein the launching step comprises the substeps of:

determining a difference between the plurality of output buffer slots and a sum of the first and third numbers; and launching a read transaction to the first node when the difference is one or more.

29. The method of claim 28, comprising the additional substep of indicating to the first node that the load slot availability criterion is satisfied when the difference is two or more, or when the difference is one and either the second number of the third number is non-zero.

* * * * *